United States Patent [19]

Siu et al.

[11] Patent Number: 4,747,929
[45] Date of Patent: May 31, 1988

[54] DEPLETION COMPARTMENT AND SPACER CONSTRUCTION FOR ELECTRODEIONIZATION APPARATUS

[75] Inventors: Kitty K. Siu, Dracut; Anil D. Jha; Gary C. Ganzi, both of Lexington, all of Mass.

[73] Assignee: Millipore Corporation, Bedford, Mass.

[21] Appl. No.: 913,897

[22] Filed: Oct. 1, 1986

[51] Int. Cl.⁴ .............................................. B01D 13/02
[52] U.S. Cl. ................................. 204/301; 204/182.4; 210/321.6
[58] Field of Search ................. 204/301, 299 R, 182.3, 204/182.4, 182.5, 182.6; 210/321.1, 321.2, 321.3, 321.4, 321.5

[56] References Cited

U.S. PATENT DOCUMENTS

| | | | |
|---|---|---|---|
| 2,891,900 | 6/1959 | Kollsman | 204/301 |
| 2,894,894 | 7/1959 | Kressman et al. | 204/301 |
| 3,201,339 | 8/1965 | Tsunoda et al. | 204/301 |
| 4,437,967 | 3/1984 | Sanchez et al. | 204/182.7 X |
| 4,632,745 | 12/1986 | Giuffrida et al. | 204/182.4 X |

FOREIGN PATENT DOCUMENTS 595472  4/1960  Canada ............................... 204/301

Primary Examiner—John F. Niebling
Assistant Examiner—John S. Starsiak, Jr.
Attorney, Agent, or Firm—Andrew T. Karnakis; Paul J. Cook

[57] ABSTRACT

An electrodeionization apparatus is provided for removing ions from liquids. Liquid to be purified is passed through depleting compartments containing mixed anion and cation exchange resin beads while a second liquid is passed through concentrating compartments free of ion exchange resin beads. Ions, under influence of an electrical potential, pass from the depleting compartments into the concentrating compartments through ion permeable membranes. A spacer for each depleting compartment is provided which retains the beads within the compartment, promotes even flow through the compartment and prevents plugging of the compartment inlet by the beads and external foulants.

5 Claims, 5 Drawing Sheets

DEPLETION COMPARTMENT AND SPACER CONSTRUCTION FOR ELECTRODEIONIZATION APPARATUS

BACKGROUND OF THE INVENTION

This invention relates to a novel spacer construction for an electrodeionization apparatus. More specifically, this invention relates to a spacer construction adapted to retain ion exchange resin beads within an ion depleting compartment while promoting even liquid flow within the compartment and preventing plugging of liquid inlets to the compartment by the beads.

The purification of a liquid by reducing the concentration of ions or molecules in the liquid has been an area of substantial technological interest. Many techniques have been used to purify and isolate liquids or to obtain concentrated pools of specific ions or molecules from a liquid mixture. The most well known processes include electrodialysis, liquid chromatography, membrane filtration and ion exchange. A lesser known methodology is electrodeionization, occasionally mistermed filled cell electrodialysis. Although electrodeionization has the potential to be quite effective in removing ions from liquid, it has never been developed to the degree that it is competitive either structurally or operationally with the better known separation techniques. This is due primarily to the inconsistencies of structural design incurred by the presently known modes of use. This lack of structural design precision and nonpredictability of results have reduced the use of electrodeionization to the point where it is relatively unknown even to practitioners skilled in separation methodologies.

The first apparatus and method for treating liquids by electrodeionization was described by Kollsman in U.S. Pat. Nos. 2,689,826 and 2,815,320. The first of these patents describes an apparatus and process for the removal of ions within a liquid mixture in a depleting chamber through a series of anionic and cationic diaphragms into a second volume of liquid in a concentration chamber under the influence of an electrical potential which causes the preselected ions to travel in a predetermined direction. The volume of the liquid being treated is depleted of ions while the volume of the second liquid becomes enriched with the transferred ions and carries them in concentrated form. The second of these patents describes the use of macroporous beads formed of ion exchange resins as a filler material positioned between the anionic or cationic diaphragms. This ion exchange resin acts as a path for ion transfer and also serves as an increased conductivity bridge between the membranes for the movement of ions. These patents represent the primary structural framework and theory of electrodeionization as a technique. The term electrdeionization refers to the process wherein an ion exchange material is positioned between the anionic and cationic diaphragms. The term electrodialysis relates to such a process which does not utilize ion exchange resins between the anionic and cationic diaphragms. Despite the fact that the Kollsman technique has been available for over 25 years, this technology has not been developed even to the point of practical use. This is due in no small part to the lack of structural designs and the unavailability of operational mode parameters which afford reliable operation of the electrodeionization apparatus. Illustrative of prior art attempts to use the combination of electrodialysis and ion exchange materials to resins to purify saline from brackish water are described in U.S. Pat. Nos. 2,794,777; 2,796,395; 2,947,688; 3,384,568 and 4,165,273. Attempts to improve electrodeionization apparatus are shown in U.S. Pat. Nos. 3,149,061; 3,291,713; 3,515,664; 3,562,139; 3,993,517 and 4,284,492.

Despite the contributions of the prior art, no reliable electrodeionization apparatus has been produced. The typical device fouling and scaling problems of electrodeionization remain unalleviated. Presently described electrodeionization apparatus remain unsuitable for desalination or for the production of high purity water. Hard waters, silica-containing waters and highly saline brackish waters, and waters containing colloidal particles and foulants still represent liquids that cannot be consistently and reliably purified by presently known electrodeionization apparatus and modes of operation. Extensive maintenance and cleaning of these apparatus remain necessary, the quality and volume of the purified liquids remain erratic and the ability to produce at least 1 meg-ohm centimeter quality water consistently and in sufficient volume remain unachieved.

Furthermore, the use of resin beads can lead to channeling of liquid through the depleting compartment rather than even flow across the width of the compartment. Liquid channeling can cause undesirable incomplete treatment of the ion containing liquid since it contacts only a small portion of the resin beads which rapidly lose their capacity to conduct ions. In addition, the resin beads can migrate to the depleting compartment inlets and outlets and block them.

Accordingly, it would be desirable to provide an electrodeionization apparatus capable of producing a high purity deionized water over long periods of time without the need for shutting down the apparatus either because of reduction of ion exchange resin performance or because of particle or scale build-up. Furthermore, it would be desirable to provide such an apparatus which promotes even flow through the depleting compartments and which can be operated efficiently with low energy requirements and high liquid throughput.

SUMMARY OF THE INVENTION

The present invention provides a spacer for a depleting compartment of an electrodeionization apparatus which promotes even distribution of liquid through the compartment. The spacer comprises a shaped element with a liquid inlet means which includes a manifold having a base and projections extending from the base and a plurality of channels. The inlet means is in fluid communication with a primary manifold and an open central section of the spacer. The projections promote uniform flow from the primary manifold through the channels. The central section of the ion depletion compartment includes ribs extending the length of the central section which divide the central section into subcompartments. The ion exchange resin beads within the subcompartments are retained in the subcompartments by bonding or physically restraining the cationic permeable membrane to one surface of the depleting compartments and to the ribs and bonding or physically restraining the anionic permeable membrane to the opposing surface of the depleting compartment to the ribs, thereby to define the subcompartments. The concentrating compartments into which ions migrate from the depleting compartments are free of ion exchange beads. The electrodeionization apparatus can comprise a single stage or a plurality of stages in series wherein the process voltage can be controlled independently in each stage, if desired.

DETAILED DESCRIPTION OF SPECIFIC EMBODIMENTS

The spacer forming the ion depletion compartments is utilized in an electrodeionization apparatus wherein each electrodeionization electrical stage includes an anode and a cathode, a series of concentration compartments and a series of depletion compartments that contain an ion exchange material such as a mixture of anion exchange resin and cation exchange resin. The depletion compartment spacer is formed so that the ion exchange resin mixture is housed within independent discrete subcompartments each of which has a width of about four inches or less, preferably between about 0.5 and about 1.5 inches. The discrete subcompartments are formed by securing, such as by bonding, both the anion permeable membrane and the cation permeable membrane to the periphery of the depletion compartment spacer and to ribs which extend across the thickness of and along the entire length of the central section of the depletion compartment so that each subcompartment is defined by a pair of ribs, the anion permeable exchange membrane and the cation permeable membrane. The spacer has an inlet means comprising a primary manifold in fluid communication with a secondary manifold formed of a base and a plurality of projections extending from the base and a plurality of channels. The secondary manifold and channels are in fluid communication with the primary manifold and the subcompartments. An outlet is positioned in fluid communication with the subcompartments for removing liquid from the spacer. In order to prevent membrane bowing, fingers can be utilized which extend from a support base for the channels into the resin bead bed. The thickness of subcompartments is between about 0.05 and about 0.25 inches preferably between about 0.06 and 0.125 inches. Generally the length of the subcompartments is between about 5 and 70 inches and can be longer if desired, limited by practical considerations such as by pressure along the subcompartment length.

The solid ion exchange material positioned within the subcompartments is constrained from moving between subcompartments by the ribs and by the ion permeable membranes. Representative suitable solid ion exchange materials include fibers or beads or the like. When employing ion exchange beads, typical bead diameter is about 0.04 inches or less, preferably between about 0.033 and about 0.012 inches in diameter (20 to 50 mesh).

The subcompartments can contain 100% anion exchange material, 100% cation exchange material or a mixture of the two. When it is desired to remove only a particular anion or particular cation, 100% of the appropriate ion exchange material is used. Usually it is desired to remove both cations and anions in order to produce a purified liquid product. When utilizing strong acid-base resin materials such as beads, the ratio of anion exchange resin beads to cation exchange resin beads generally are about 60 to 40 percent by volume.

Figure 5:
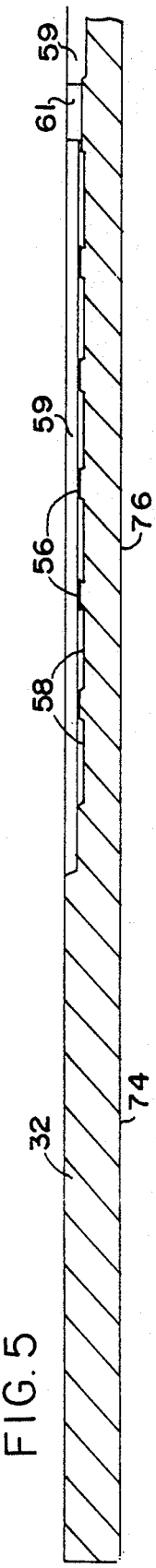
FIG. 5 is a cross-sectional view taken along line 5—5 of FIG. 4.
Figure 6:
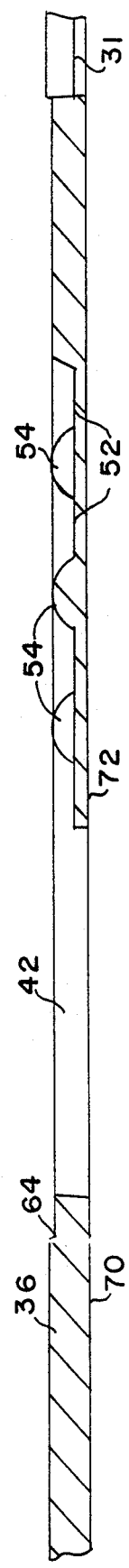
FIG. 6 is a cross-sectional view taken along line 6—6 of FIG. 4.
Figure 7:
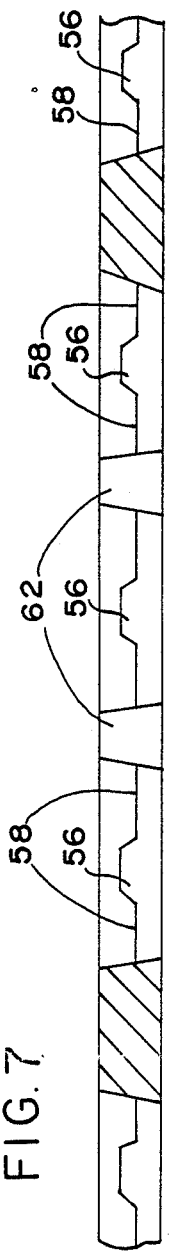
FIG. 7 is a cross-sectional view taken along line 7—7 of FIG. 4.

By utilizing the subcompartment structure in the depleting compartments, efficient mixing of the liquid and the beads therein is attained while avoiding channeling of the liquid through the depleting compartments as well as avoiding compaction or movement of the beads within a portion of the volume of the depleting compartment. The secondary manifold having the projections function to evenly distribute incoming liquid below to the channel inlets and thence to the subcompartments. The channels have a generally rectangular cross-section and a cross-sectional area such that they do not become blocked by a resin bead and they prevent migration of the beads out of the subcompartments. The channels have a width between about 0.03 and 0.25 inches, preferably between about 0.05 and 0.15 inches and a length between about 0.1 and 1.5 inches, preferably between about 0.3 and 0.7 inches. The thickness of the channels 58 from the bottom surface of the channels to the covering sheet 59 (See FIG. 5) is between about 0.003 and 0.030 inches, preferably between about 0.005 and 0.010 inches. By maintaing the channel dimensions within the values set forth above, adequate liquid flow is obtained, migration of resin beads from the depletion compartments is substantially prevented and the channels are resistant to plugging by incoming foulants.

The fingers extending into the top surface of the resin beads provide support for the membranes as adhered to the spacer in those areas devoid of resin, and are preferably between about 0.5 and 3 inches long.

This invention will now be described with reference to the accompanying drawings. A multistage electrodeionization apparatus is shown in FIG. 1.

Figure 1:
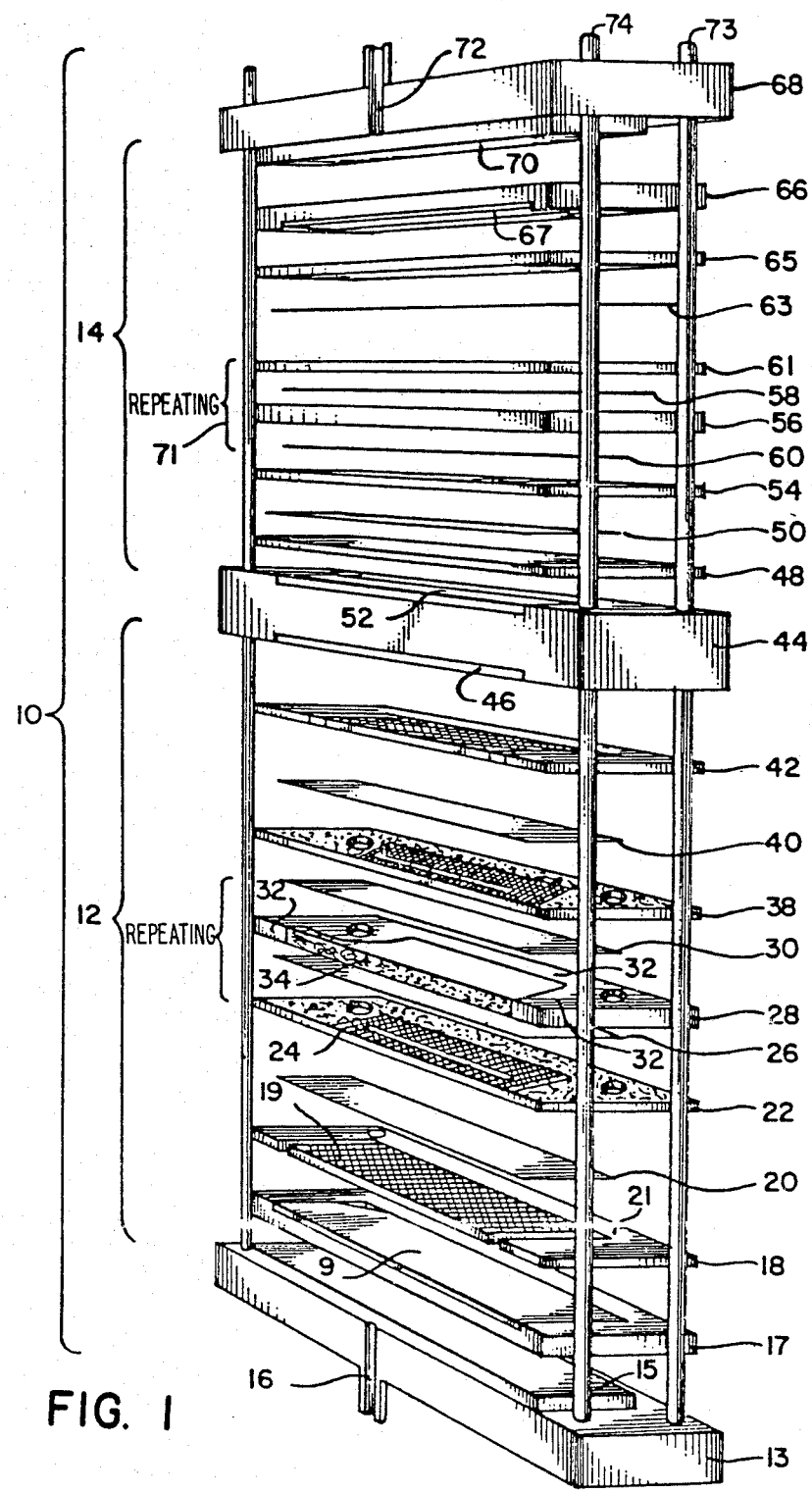
FIG. 1 is an exploded view of a multistage electrodeionization apparatus with which the spacer of this invention can be used.

Referring to FIG. 1, the electrodeionization apparatus 10 comprises a first stage 12 and a second stage 14. The first stage 12 includes an end plate 13 having an expandable bladder 15 and an inlet 16 for fluid to expand the bladder 15. Adjacent the endplate 13 is an endblock 17 to house electrode 9 and provide desired manifolding. An electrode spacer 18 is positioned adjacent to the end block 17 and includes a screen 19 which effects turbulent flow of liquid passing through the electrode spacer 18. An ion permeable membrane 20 is gasketed to the periphery 21 of electrode spacer 18. A spacer 22 formed of flexible material includes a screen 24. The spacer 22 and screen 24 comprise the concentrating compartment of the electrodeionization apparatus of this invention. The depleting compartment structure of this invention comprises an ion permeable membrane 26, a spacer formed of rigid material 28 and an ion permeable membrane 30. The ion permeable membranes 26 and 30 are sealed to the periphery 32 of the spacer 28 on opposite surfaces of the spacer 28. Mixed ion exchange resin beads 34 are housed within a central space which includes ribs (not shown) and are retained therein by the membranes 26 and 30. The unit which comprises spacers 22 and 28 and membranes 26 and 30 are repeated usually between about 5 and about 100 times in order to provide reasonable liquid flowthrough capacity in stage 12. A spacer 38 formed of flexible material and ion exchange membrane 40 gasketed to the periphery of spacer 38 forms the end concentrating compartment similar to 18. An electrode spacer 42 is positioned adjacent the middle block 44 and end electrode 46.

Stage 14 is identical in structure to stage 12 but can have more or fewer cell pairs and includes electrode spacer 48 and membrane 50 attached to the periphery of electrode spacer 48. An electrode 52 is provided in middle block 44. The repeating unit in stage 14 comprises a spacer 54 formed of flexible material as well as a spacer 56 formed of rigid material to which are secured such as by bonding or by mechanical means membranes 58 and 60. A spacer 61 formed of flexible material then is provided followed by a membrane 63, an electrode spacer 65, and endblock 66 and electrode 67, an end plate 68 and a flexible bladder 70 which is inflated by means of fluid passing through conduit 72. Flowthrough of liquid in the concentrating and depleting compartments as well as in the electrode compartment will be explained with reference to the remaining figures. The electrodeionization apparatus is retained in place by bolts 73 and 74 as well as by bolts on the opposing end of the apparatus 10 that extend along the entire length of the apparatus 10. The number of repeating units in the second stage 14 is usually about 5 and about 100, preferably between about 20 and about 60.

By independently varying voltage, electrical current can be controlled in each stage to provide good economy and efficiency for the overall electrodeionization process. Alternatively, a single stage 14 can be utilized as the apparatus of this invention or additional stages can also be utilized. In any event, the flow rate of liquid through the depleting and concentrating compartments and the operating voltage utilized in a particular stage is controlled to maximize efficiency for the overall apparatus in terms of ion removal and electrical power utilized.

Figure 2:
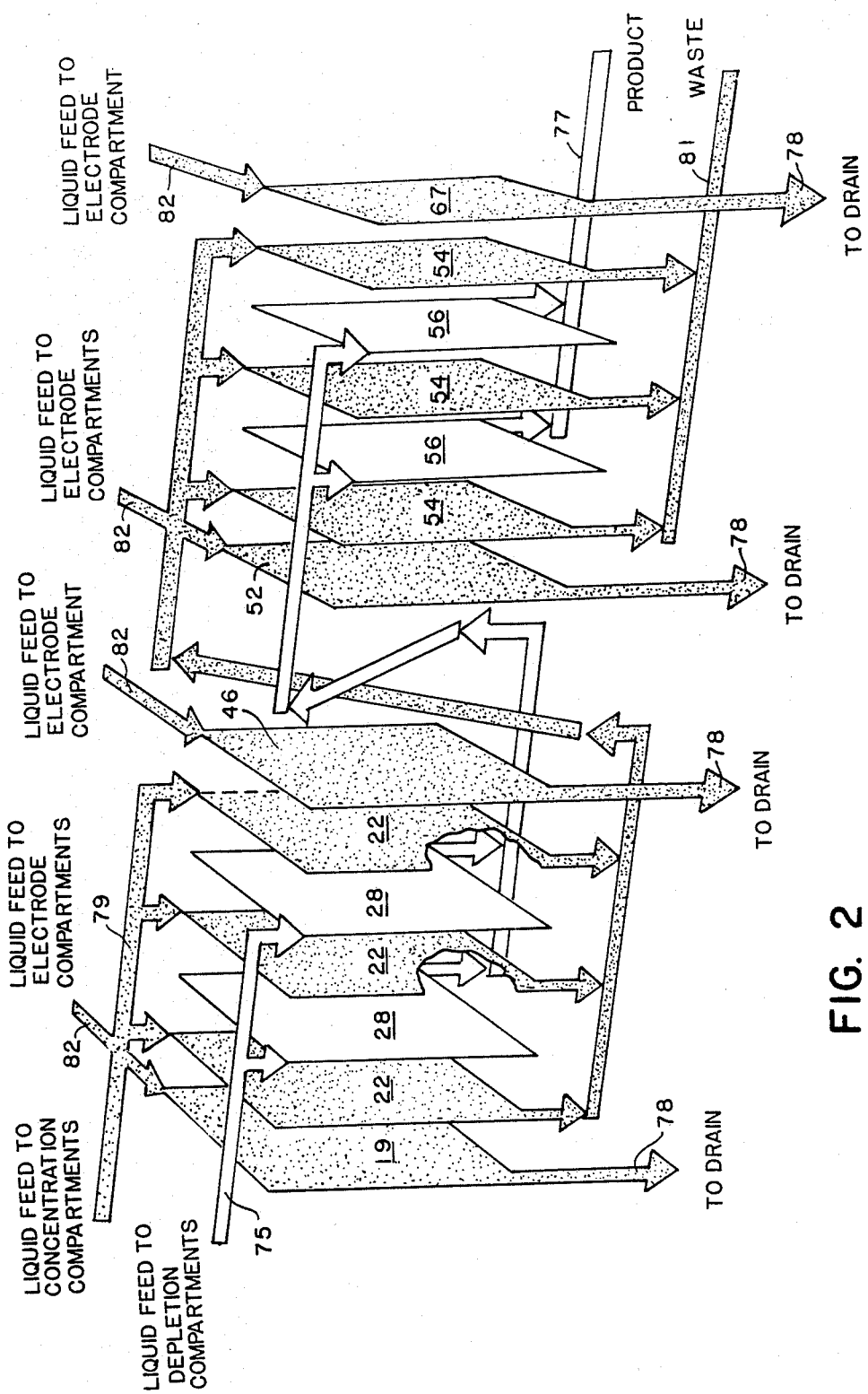
FIG. 2 is a schematic view illustrating the operation of the apparatus of FIG. 1.

Referring to FIG. 2, the flowpaths of the liquids in the various compartments are explained. Liquid to be purified enters inlet 75, passes through depletion compartments 28, is then passed through depletion compartments 56 and is recovered from outlet 77. Concentrating liquid is passed through inlet 79 through concentrating compartments 22 and 54 and thence through outlet 81 to drain. Liquid electrolyte is circulated through electrode compartments 19, 46, 52 and 67 from inlets 82 and is discarded to drain outlets 78.

Figure 3:
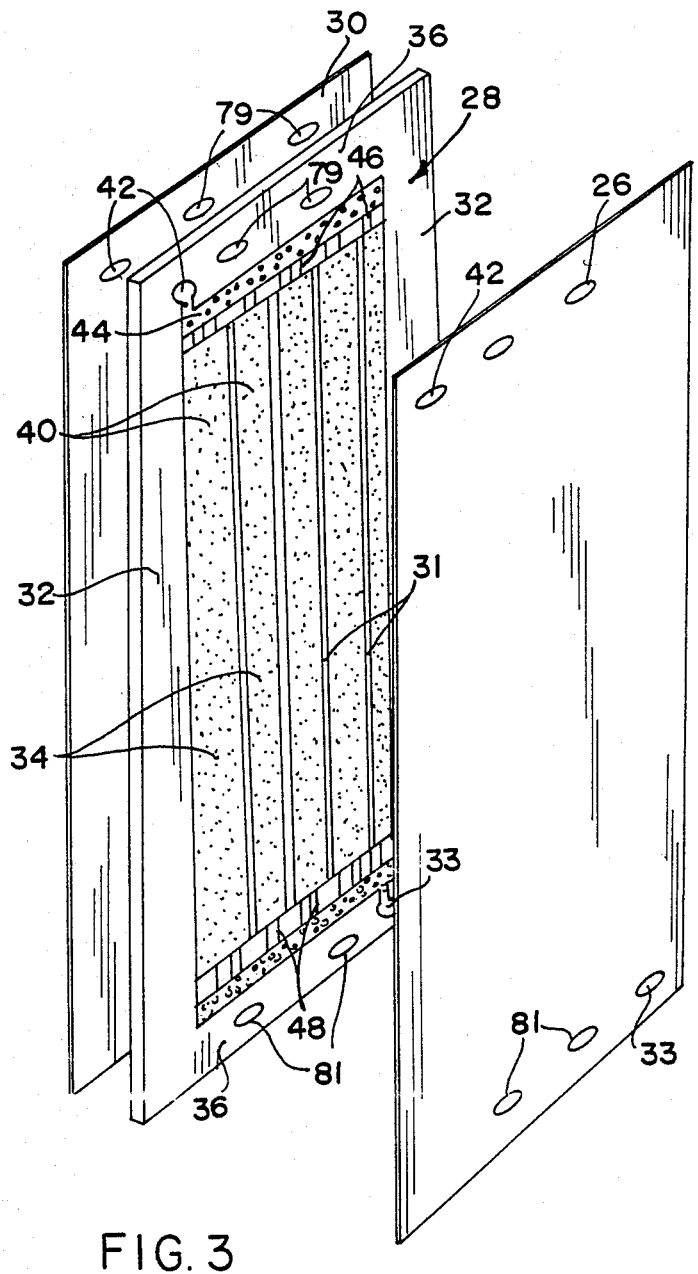
FIG. 3 is a pictorial view showing the depletion chambers of the apparatus of this invention.
Figure 4:
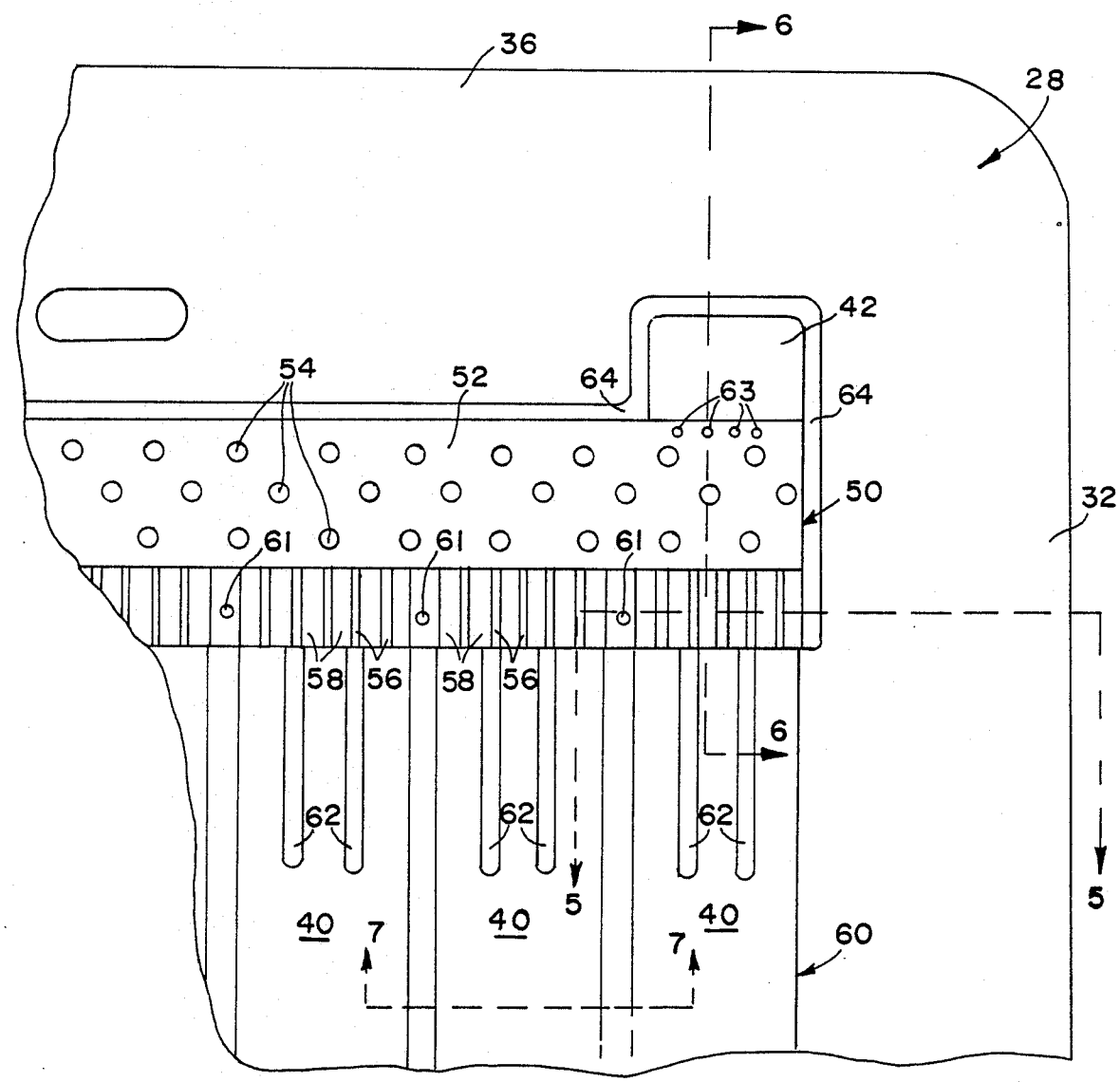
FIG. 4 is a detailed view of the liquid inlet means to the structure of FIG. 3.

Referring to FIG. 3, the structure of the depleting compartments of this invention is shown. The depleting compartment comprises a rigid spacer 28, an anion permeable membrane 30 and cation permeable membrane 26. The ion exchange materials 34 are housed within subcompartments formed by the membranes 26 and 30, longitudinal sections 32, width sections 36 and the ribs 31. The membranes 26 and 30 are sealed along their entire length to longitudinal section 32 and ribs 31 and along their widths to width sections 36. Thus the individual subcompartments 40 are effectively isolated from each other. Membranes 26 and 30 as well as spacer 28 also are provided with inlet 42 and outlet 33 for passage of liquid to be deionized through the subcompartment 40. The membranes 26 and 30 as well as spacer 28 are provided with inlets 79 and outlets 81 fr passage of concentration liquid to and from the concentration compartments.

Referring to FIGS. 4-7, the spacer 28 includes a primary inlet 42 and a secondary inlet comprising (a) a manifold 50 having a base 52 with a plurality of projections 54 extending from the base 52 (b) a plurality of channels 58. The manifold 50 is in fluid communication with the primary inlet 42 and channels 58 formed by spaced apart channel ribs 56. The relative width of the channel ribs 56 to the width of the channels 58 are controlled to provide satisfactory liquid flow. The open channel as 58 should be at least 33% of the sum of the areas of ribs 56 and channels 58 (preferably 50 to 90%). The channels 58 are in fluid communication with the subcompartments 40 filled with resin beads and defined by ribs 31. The subcompartments 40 are positioned within a central section 60 defined by longitudinal sections 32 and width section 36. Optionally, the spacer of this invention can include fingers 62 which extend into the subcompartments 40, below the upper surface of the bed of resin beads. A liquid impermeable sheet material 59 is adhered to the spacer 28 to cover the projections 54 and the channel ribs 56. The sheet material 59 is positioned on manifold seat 64 and is adhered to the spacer at seat 64 while leaving inlet 42 open and is adhered to posts 61 which extend through the thickness of the sheet 59. The sheet 59 rest on projections 54 and inlet posts 63. One of the ion permeable membranes then is adhered to the liquid impermeable sheet, the subcompartment ribs 31, the longitudinal section 32 and the width sections 36. The second ion permeable membrane is adhered to the second surface 70 of width sections 36, the bottom surface 72 of manifold base 52, subcompartment ribs 31, the bottom surface 74 of longitudinal section 32 and the bottom surface 76 of the manifold and channels.

In use, the liquid to be deionized enters primary inlet 42 and is directed evenly through manifold 50 wherein channeling is minimized and the sheet supported by projections 54. Incoming liquid passes through channels 58 into subcompartments 40 where the liquid contact ion exchange resin beads where they are subjected to an electrical voltage in order to pass anions through membrane 30 and cations through membrane 26. The purified liquid then passes through outlet channels 48 and spacer outlet 33 wherein it is collected in accordance with the explanation of FIG. 2.

Any anion permeable membrane or cation permeable membrane having the strength to withstand the operating pressure differential, typically up to about 5 psi, can be utilized in the present invention. It should be pointed out that sealing of the membranes to the ribs forming the subcompartments permits the use of higher operating pressures and enhances the apparatus of the prior art since the assembly strength is thereby increased.

Representative suitable anion permeable membranes include a homogeneous type web supported styrene-divinylbenzene based with sulfonic acid or quarternary ammonium functional groups sold under the identifications CR61-CZL-386 and AR 103-QZL-386 by Ionics Inc.; a heterogeneous type web supported using styrene-divinylbenzene based resins in a polyvinylidene fluoride binder sold under the identifications MC-3470 (cation premeable) and MA-3475 (anion premeable) by Sybron/Ionac; homogeneous unsupported membrane sheets based on polyethylene which is sulphonated or aminated with quaternary groups, sold under the name, Raipore by RAI Research Corporation; a homogeneous type web supported styrene-divinylbenzene based with sulfonic acid or quaternary ammonium functional groups sold under the name Neosepta by Tokuyama Soda Co. Ltd.; a homogeneous type web supported styrene-divinylbenzene based with sulfonic acid or quaternary ammonium functional groups sold under the name Aciplex by Asahi Chemical Industry Co. Ltd.

We claim:

1. A spacer for use in an electrodeionization apparatus which comprises:

a shaped element having a solid periphery comprising two width sections connected to two longitudinal sections, a first liquid inlet in one of said width sections, a liquid outlet in a second of said width sections, said width sections and said longitudinal sections defining a central open section positioned between said longitudinal sections, said central section comprising an open area extending through the thickness of said element, a plurality of ribs extending the length of said central section to form subcompartments having a width defined by the distance between two adjacent ribs or the distance between a rib and an adjacent longitudinal section, a second inlet means comprising (a) a manifold having a base surface and spaced apart projections extending from said base surface and (b) a plurality of generally rectangular channels, said manifold being in direct fluid communication with and being positioned between said first inlet and said central secion, and fingers extending from said manifold into said subcompartments.

2. A depletion compartment for use in a deionization apparatus which comprises:

a shaped element having a solid periphery comprising two width sections connected to two longitudinal sections, a first liquid inlet in one of said width sections, a liquid outlet in a second of said width sections, said width sections and said longitudinal sections defining a central open section positioned between said longitudinal sections, said central section comprising an open area extending through the thickness of said element, a plurality of ribs extending the length of said central section to form subcompartments having a width defined by the distance between two adjacent ribs or the distance between a rib and an adjacent longitudinal section, said subcompartments being substantially filled with ion exchange particles, substantially the entire open section comprising said central section containing particulate ion exchange material, a second inlet means comprising (a) a manifold having a base surface and spaced apart projections extending from said base surface and (b) a plurality of generally rectangular channels, formed from spaced-apart longitudinal channel ribs extending from said base surface, said manifold being in direct fluid communication with said first inlet and said channels being in direct fluid communication with said maniforld and said central section, fingers extending from said manifold into said subcompartments, an anion permeable membrane adhered to one surface of said shaped element including said ribs and a cation permeable membrane adhered to a second surface of said shaped element including said ribs, a liquid-impermeable sheet adhered to said projections and said channel ribs, either of said anion permeable membranes or said cation permeable membrane being adhered to said shaped element directly to said liquid-impermeable sheet, said anion permeable membrane and said cation permeable membrane being adhered to said width sections, said longitudinal sections and said liquid impermeable sheet in a manner to prevent liquid from passing into the central section without first passing through said first liquid inlet and said second inlet means.

3. The apparatus of any one claims 1 or 2 wherein the width of said subcompartments is between about 0.5 and 1.5 inches.

4. The apparatus of any one of claims 1 or 2 wherein the thickness of said subcompartments is between about 0.06 and 0.125 inches.

5. The apparatus of claim 2 wherein the ion exchange particles comprise a mixture of anion exchange resin beads and cation exchange resin beads and wherein the volume ratio of anion exchange resin beads to cation exchange resin beads in said ion depletion compartments is between about 2.0 and 0.5.

* * * * *